3,345,138
METHOD FOR DETECTING PREGNANCY
John Frederick Eberhard, Frank T. Friedl, and Klyde H. Stephens, Tulsa, Okla., assignors to Eberhard-Stephens Laboratories, Inc., Tulsa, Okla., a corporation of Oklahoma
No Drawing. Filed Aug. 29, 1966, Ser. No. 575,557
15 Claims. (Cl. 23—230)

This application is a continuation-in-part application of copending application Ser. No. 319,963, filed Oct. 30, 1963, and now abandoned.

This invention relates to an improved method for determining the existence or non-existence of the state of pregnancy.

There has been a recognized need for a reliable method for clinically testing and evaluating manifestations associated with the female sexual physiology which attend the normal state of pregnancy, since there are a number of other pathological conditions which, through biochemical mechanisms, imitate the normal gravid condition.

The art, heretofore, has relied principally upon methods based on the detection of chorionic gonadotropin in either the urine or blood serum by bio-assay methods. Such methods depend on a physiological response to a specific chemical activation by an appropriately susceptible animal.

More recently, improved tests have been developed, although they are still based on the presence of chorionic gonadotropin, which depend on immunological agglutination or precipitin response, which in turn depend on a living organism to develop an antigen. These qualitative tests are, again, bio-assay in nature and depend on a finite biological reaction which indicates the presence or absence of chorionic gonadotropin. Quantitative tests depend upon the technique of making serial dilutions and performing the above-described tests on the individual dilutions until the end-point of no response is evident.

Many attempts have been made to develop testing techniques which are purely chemical in nature. The positive or negative results of these tests are determined by a color change or a precipitation which is intended to measure the hormonal overflow related to the physiology. These tests have not been reliable since the normal concentration of estrogens and progestational hormones fluctuate too erratically among different individuals for one to be able to determine a particular hormone concentration above which it may always be assumed the gravid condition exists and below which it does not exist. Hormone concentrations may also vary depending on the season of the year and on the particular time during the normal sexual cycle.

Certain chemical test methods have been devised which measure the presence of metabolic excreta such as histidine, which are perculiar to pregnancy, but these tests are of no use until the pregnancy has been in existence for some time since such metabolic end products appear in the individual's system much later than the more significant diagnostic indicators. Because the known tests for pregnancy have been highly specialized, these tests have been used largely to confirm rather than predict suspected pregnancy. Thus the diagnostic aids in gynecology for determining the onset of clinical pregnancy have often been inadequate to determine the normal or abnormal course of said pregnancy and to differentiate pathological conditions from the normal.

The principal object of this invention is to provide a method for determining the condition of pregnancy in the mammalian female.

Another object of this invention is to provide a method for determining the condition of pregnancy at a very early stage.

A further object is to provide a method of testing for variations in female sexual physiology which is easily and conveniently performed.

Another object is to provide a method of testing for variations in female sexual physiology resulting in data which correlate with the measurable titre of chorionic gonadtropin, but which is not in effect actual measurement of this hormone.

A still further object of this invention is to provide a method for distinguishing between normal pregnancy and threatening abortion by means of quantitative measurements.

These and other objects will become readily apparent from the following description of the invention.

The improved method of testing for clinical pregnancy employed in the present invention is based upon a phenomenon which occurs when urine specimens are treated in a certain manner. This phenomenon varies in proportion to variations in the amount of chorionic gonadotropin present, but the test method does not depend on a direct measurement of this hormone; rather it is dependent on a direct measurement of an unknown constituent or factor which appears in the urine shortly after pregnancy is initiated.

Basically the invention is a chromatophoric test for the presence of the factor in urine samples. The test is a comparison of the time intervals between the time a composition comprising an alkyl or an aryl substituted phenylenediamine with or without a catalyst and an oxidant is added to the previously prepared urine sample and to a blank solution and the time at which a color change takes place in the urine sample and in the blank. The time intervals are determined by the rate of oxidation of the phenylenediamine homologue catalyzed by the divalent metal resulting in the formation of aniline black. The rate of oxidation normally proceeds at a fixed rate under a given set of conditions but this rate is inhibited by the presence of urine obtained from a pregnancy human female.

Though retardation of the oxidation reaction occurs in the absence of a catalyst, it is more marked in the presence of the catalyst and, therefore, the rate of reaction as determined by the color change is more easily observed. The mechanics of the retardation of the oxidation reaction are not fully understood. However, it is probable that this retardation is the result of a bi-functional capacity of the factor in the urine to inhibit oxidation and simultaneously chelate cupric ions. Thus, by removal of the cupric ions from catalytic participation in the oxidation reaction and the resultant inhibition of oxidation which occurs in the case of urine derived from a pregnant female, it is possible to distinguish between the urine of pregnant and non-pregnant human females.

Any alkyl or aryl subsituted phenylenediamine may be used. These include N,N-dimethyl phenylenediamine, N,N,N',N', tetramethyl phenylenediamine, N phenyl phenylenediamine, any of the ortho, metal, or para substituted diamine toluenes, etc. N,N-dimethyl phenylenediamine, commonly known as amino dimethyl aniline, is preferred since the color change is well pronounced and therefore easily detected. The alkyl or aryl substituted phenylenediamine is used usually in the form of a salt, such as an oxalate, hydrochloride or sulfate, the oxalate being preferred.

The catalyst, if employed, may be any of the well known divalent metal oxidation catalysts, such as the salts of vanadium, manganese, iron, cobalt, copper, or nickel. A copper-containing catalyst, for example copper sulfate, is preferred.

An oxidant may be employed if desired, though this is not necessary. Hydrogen peroxide is a preferred oxidant. However, sodium peroxide and ammonium persulfate may be used in amounts sufficient to yield an equivalent amount of available peroxide.

As with any test method involving color interpretation, it is necessary to have a uniformly consistent background color. It therefore is often necessary to remove from solution any colored material from the sample and also any constituents which interfere with proper color development or with the developed color itself. In the present case, it may be necessary to decolorize the urine sample and also to remove any interfering susbtances such as steroids, phenolic constituents, calcium or magnesium ions, etc. Various procedures may be used for preparatory treatment of the sample prior to the colorimetric test. The following are but a few examples of methods for treating the sample.

The sample is treated with an excess of finely divided activated carbon under alkaline conditions, the pH of the sample being maintained between 7.5 and 8. The mixture is then filtered, after which the acidity is adjusted to a pH between 1 and 6.5, preferably 4. The sample is extracted with both butanol and ether. These extractions may be conducted simultaneously by adding the butanol and ether together to the sample. However, it is preferable to first extract with an equal volume or an excess of butanol and then after separation to further extract the sample with a one-half volume of ether.

The activated carbon removes all colorants and also conveniently removes highly nitrogenous material of low ionization which will not alkalize in alkaline media. The extraction steps under acid conditions removed from the urine sample all organo-soluble constituents, including steroids and phenolic and stereo-phenolic conjugates of the glucorinide nature.

Another method of preparing the sample is to adjust the pH to between 1 and 4 and then treat the sample with activated carbon such as that sold under the trade name "Darco" by Atlas Powder Company. One or two grams of carbon per 15 ml. of urine sample is usually adequate. The mixture is continuosly agitated for a period of about five minutes, after which it is filtered. To the filtrate an excess (two grams per 15 ml. of urine) of $Na_2HPO_4$ is added and after turbidity has developed, the urine is again filtered. Finally the pH of the filtered urine is adjusted to the range of 6.8 to 7.2 with borax-boric acid buffer. The presence of borate ion in the specimen, though not required, has an advantageous effect through an improved intensification of the colors developed during the chromatographic test. The improved color will occur with from trace amounts to full saturation of the solution with borate ion. This may be added to the treated specimen as borax or, more conveniently, as a borax-boric acid buffer which is a saturated aqueous solution of approximately equal parts borax and boric acid.

Alternatively the urine sample may be prepared by a procedure carried out with only one filtration. To 15 ml. of urine specimen about 1.5 gram of activated carbon, one gram of a cation exchange resin, and about 0.5 gram of $KH_2PO_4$ are added. Ion exchange resins of the carboxylic type such as acrylic are satisfactory. One such resin is sold under the trade name "Amberlite CG–50" produced by Rohm & Haas Company. The mixture is continuously agitated for about five minutes and then filtered, after which the pH of the filtrate is adjusted to the range of 6.8 to 7.2 with borax-boric acid buffer.

The purpose of the activated carbon in the last two examples is to absorb any coloring matter, as was the case in the first example. Since in the latter two examples acid conditions prevail, some acidic constituents are also absorbed and removed. Both the ion exchange resin and the monobasic phosphate serve to remove interfering calcium or magnesium ions.

It is possible to extract the unknown factor present in the urine of pregnant women from the urine specimen and thus avoid any possible interference by other material present in the urine specimen. The pH of the urine is adjusted to an alkaline range between 7 to 8.5 by any base material after which the alkaline specimen is passed through activated carbon as previously described. The colorless filtrate is then adjusted by acid to a pH of about 4 and to this volume of specimen eight volumes of acetone are added to effect a precipitate.

The precipitate containing the unknown factor is collected by centrifugation or overnight gravity separation and generally amounts to a ratio of nearly one gram per gallon of original urine specimen. It is dissolved in a small amount of water, e.g. 5 to 10 ml., thereby producing a concentrate. The aqueous concentrate is extracted in a separatory funnel with butanol to remove soluble organic materials. The extracted aqueous solution is placed in a dialysis bag of about 0.00070 inch thickness and dialized against an equal volume of distilled water. The distilled water is replaced until a sample of the contents of the dialysis bag will not give a colorimetric positive test when using the novel test method described later.

All dialysate is retained and combined. To this volume, which approximates 150–200 ml., two additional volumes of acetone are added to the filtrate causing an additional fraction to precipitate. This fraction contains the unknown factor if the urine specimen was that of a pregnant female. The factor will not be present in the precipitate derived from females who are not pregnant. The precipitate is dissolved in a volume of distilled water equivalent to the volume of the original urine specimen, after which it may be subjected to the novel colorimetric test.

In the colorimetric test the oxidation of the phenylenediamine results in first the appearance of a pink-red color which deepens to a magerta and then to a purplish grey and finally to a green color upon complete oxidation. The element of time in the transition first to the pink-red color and then to the green color is the criterion by which urine from pregnant and non-pregnant females is distinguished. In the case of urine from non-pregnant females, the time required to become pink-red and subsequently green is substantially less than the time required for the equivalent color change to occur in urine from pregnant females. Generally the color transition into the green regions occurs in the negative urine in about five minutes. Positive urine samples on the other hand, treated in like manner, fail to exhibit this color transition for periods from six minutes to one hour. In other words, started simultaneously under the same conditions, a negative test will be green while the positive test is still red. These time ranges are dependent on a number of variables common to colorimetric determinations. These include the concentration of urine in the test solution and the concentration of the factor in the urine which, of course, determines the concentration in the test solution. The above-mentioned time intervals are based on a 5 ml. urine sample to which has been added .2 ml. of a 0.5 percent $CuSO_4$ solution, 0.1 ml. of a 1 percent amino dimethyl aniline oxalate solution, and 0.5 ml. of 3 percent $H_2O_2$. These time intervals are based on this particular concentration of reactants and of course will vary with either increased or decreased concentrations of reactants. Before one may conduct a test using different concentrations of reactants, it would be necessary that he first conduct the tests on urine samples known to have been obtained from both pregnant and non-pregnant females. From these preliminary test runs, it is possible to determine what concentrations will best differentiate between positive and negative urine specimens.

Though the concentrations of reagents may vary widely, the following ranges are preferred, using 10 ml. of the treated specimen:

Alkyl and aryl substituted phenylenediamine homologues—N,N - dimethyl phenylenediamine oxalate—0.0125 gm. to 0.5 gm. This is usually added in the form of dilute solutions ranging from 0.05 ml. of a 0.25 percent solution to 0.5 ml. of a 1.0 percent solution. In the treated specimen this represents a concentration ranging from 0.00125 percent to 0.05 percent. Concentration ranges for other alkyl and aryl substituted phenylenediamine homologues are equivalent to that for N,N-dimethyl phenylenediamine oxalate; equivalency, of course, being based on equal numbers of phenylenediamine nuclei.

Catalyst—None to 0.25 gm. This is added as a dilute solution ranging up to 0.5 ml. of a 0.5 percent solution, the concentration in the treated specimen being up to 0.025 percent. Too high catalyst concentrations will produce false negative results.

Oxidizing agent—None to 3 ml. of 3 percent $H_2O_2$ or its equivalent.

Any urine specimen may be employed to conduct the test. However, to ensure adequate concentration of the urinary constituents, it is preferred that "first morning" urine be employed. In any case, for best results the urine sample should have a specific gravity of at least 1.020.

The actual test procedure is easily accomplished with a minimum of time and effort on the part of the physician or laboratory technician. A typical procedure is to add to a urine specimen prepared as described above N,N-dimethyl phenylenediamine oxalate, copper sulfate, and hydrogen peroxide, after which the mixture is immediately stirred and then allowed to stand. Negative results are indicated if the solution becomes green within a short period of time; positive results are indicated if the solution is slow to turn pink-red or the pink-red color persists for some time without turning green. For any given set of conditions, it is possible to determine the extent to which pregnancy has progressed, by comparing the time required for the complete color transition, to an equivalent time for a known gestation term calibration.

The following examples further describe the novel test for pregnancy:

*Example I*

To 15 ml. of urine specimen was added 1 ml. of 15 percent HCl and 1.5 gm. of activated carbon. The mixture was stirred for about five minutes and then filtered. Two grams of $Na_2HPO_4$ were added to the filtered urine and after turbidity had developed the mixture was again filtered. Enough borax-boric acid buffer was then added to adjust the pH to between 6.8 and 7.2.

*Example II*

To 10 ml. of urine specimen prepared according to Example I was added 0.15 ml. of a 0.5 percent solution of $CuSO_4$, 0.1 ml. of a 1 percent solution of N,N-dimethyl phenylenediamine oxalate, and 1 ml. of a 3 percent solution of hydrogen peroxide. After stirring, the mixture was allowed to stand. The solution was a pink to red color which turned green after about 15 minutes at room temperature (25° C.), thus indicating a state of pregnancy.

*Example III*

The same procedure as described in Examples I and II was followed with another urine specimen. The pink to red color persisted for 18 minutes, indicating an early state of pregnancy.

*Example IV*

The same procedure as described in Examples I and II was repeated using another urine specimen. The pink to red color persisted for 25–30 minutes, indicating an advanced state of pregnancy.

*Example V*

The same procedure as described in Examples I and II was repeated using another urine specimen. The test solution turned green at the end of a 10-minute period, indicating no pregnancy.

*Example VI*

To 10 ml. of urine specimen prepared according to Example I was added 0.3 ml. of 0.5 percent $CuSO_4$, 0.1 ml. of 1 percent N,N-dimethyl phenylenediamine oxalate, and 1 ml. of 3 percent hydrogen peroxide. After stirring, the mixture was allowed to stand. The solution turned green in five minutes, indicating no pregnancy.

*Example VII*

The same procedure as described in Examples I and VI was followed with another urine specimen. The solution became pink in 6–7 minutes, indicating an early pregnancy.

*Example VIII*

The same procedure as described in Examples I and VI was followed with another urine specimen. The solution became pink in 8–10 minutes, indicating a pregnancy which had progressed for some time.

*Example IX*

To 10 ml. of urine specimen prepared according to Example I was added 0.1 ml. of 1 percent N,N-dimethyl phenylenediamine oxalate and 1 ml. of 3 percent hydrogen peroxide. After stirring, the mixture was allowed to stand. The solution turned green in 85–90 minutes, indicating no pregnancy.

*Example X*

A positive test in which the red color persisted for more than 90 minutes was observed with another urine specimen tested according to the procedure set forth in Examples I and IX.

The latter two examples disclose the procedure where no catalyst is present, thus requiring a much longer time for the color to develop. Examples II to VI demonstrate the faster and more easily observed results which may be obtained using increasingly greater amounts of $CuSO_4$ catalyst.

The colorimetric test may be conducted without the use of an oxidant. However, the time required for the usual color, if any, to develop is excessively long. This inconvenience can be easily overcome by using an electronic colorimeter which will detect initial color change, if any.

The following example was the procedure used in the colorimetric test where an oxidant such as peroxide was not present.

*Example XI*

To 100 ml. of urine specimen was added 10 gm. of borax and the solution was stirred until the pH reached 8.5 to 9.0. 12 gms. of activated carbon was added and stirred. After standing for about five minutes, the mixture was filtered and the filtrate was acidified with 12 ml. of 5.5 percent HCl. The solution was then extracted twice by 100 ml. portions of butanol and once by a 100 ml. portion of anhydrous ether after which it was saturated with borax to adjust the pH to 6 to 6.5 and with NaCl.

1.0 ml. of distilled water was placed in a colorimeter test tube. To this was added 10 ml. of the above prepared urine specimen. A blank reading was then taken on the Klett colorimeter equipped with a green No. 75 filter, after which 0.1 ml. of a 0.25 percent solution of copper sulfate and 0.2 ml. of a 0.5 percent N,N-dimethyl phenylenediamine oxalate solution were added and the mixture was then stirred. Readings on the colorimeter were taken three minutes after stirring and again at six minutes after stirring.

When using an electronic colorimeter, which is relatively sensitive, it is advantageous to saturate all specimens with NaCl in order to avoid variances in the concentration of chloride ions between specimens, which might have some effect on the rate of color development. As a consequence of salt saturation, residual amounts of ether which may still be soluble in the specimen are salted out, resulting in a turbid solution. To overcome this turbidity, a small, but equal volume of distilled water is added to each test solution.

Example XII

To 15 ml. of urine specimen was added 1 ml. of 15 percent HCl after which the urine specimen was passed through 1.5 gms. of activated carbon. 2 grams of $Na_2PO_4$ were added to the decolorized urine and 120 ml. of acetone was added. A precipitate immediately developed which was separated in a centrifuge. The precipitate was then dissolved in 10 ml. of distilled water. The aqueous concentrate was extracted in a separatory of butanol after which the extracted aqueous solution was dialized in a bag 0.00070 inch thick against equal volumes of distilled water. All of the dialisate was combined and two volumes of acetone were added. A precipitate formed which was removed by centrifuge and was dissolved in 15 ml. of distilled water.

Example XIII

The same procedure as described in Example II was followed using the specimen prepared in accordance with Example XII. A pink to red color persisted for 18 minutes, indicating an early state of pregnancy.

It was found that a reading below 155 at the end of three minutes or a reading below 200 at the end of six minutes indicated positive results based on test specimens known to have been obtained from both pregnant and non-pregnant human females. Conversely, a reading above 155 at the end of three minutes or a reading above 200 at the end of six minutes indicated negative results.

The colorimetric test for pregnancy described above is substantially more accurate than present-day commonly used methods. In addition, pregnancy can be detected at a much earlier stage. The following table shows the results of a series of tests made on different days following initial pregnancy. These tests were conducted using both the novel test described herein and using the common biological "frog test."

TABLE I

|  | 1st day late | 3d day late | 5th day late | 7th day late | 14th day late |
|---|---|---|---|---|---|
| Colorimetric Test | 3 | 15 | 41 | 50 | 50 |
| Frog Test | 0 | 0 | 1 | 1 | 49 |

It may be readily observed that early diagnosis was made in all cases by the seventh day following pregnancy. At that stage the commonly used frog test detected only one pregnancy.

The present colorimetric test is a marked improvement over prior test methods. The test is purely chemical in nature and therefore a supply of frogs, such as is used in the commonly known frog test, is not necessary. A substantial amount of laboratory equipment is not necessary, since the results of the test may be observed visually. If the laboratory technician prefers to use a sensitive electronic colorimeter which is available in most reasonably well-equipped laboratories, this test is adaptable to such a procedure. The colorimetric test is substantially more accurate during early stages of pregnancy, making it possible for the first time to detect pregnancy at a much earlier stage than was previously possible.

We claim:

1. A colorimetric method of testing for the state of pregnancy comprising admixing to both a urine specimen of a human female and a blank a compound taken from the group consisting of alkyl and aryl substituted phenylenediamines and their salts, a divalent metallic salt, and an oxidizing agent and comparing the time required for said urine specimen to develop a predetermined color intensity as compared with said blank.

2. The method as claimed in claim 1 wherein said divalent metallic salt is a salt of a metal of the group consisting of vanadium, magnesium, iron, cobalt, copper and nickel.

3. The method as claimed in claim 1 wherein said divalent metallic salt is copper sulfate.

4. A colorimetric method of testing for the state of pregnancy comprising admixing per 10 ml. of both a urine specimen of a human female and a blank a compound taken from the group consisting of alkyl and aryl substituted phenylenediamines and their salts in an amount equivalent to between 0.0125 gm. and 0.05 gm. of N,N-dimethyl phenylenediamine oxalate, between 0.0 and 0.25 gm. of a divalent metallic salt, and an oxidizing agent in an amount equivalent to between 0.0 and 3 ml. of a 3 percent hydrogen peroxide solution and comparing the time required for said urine specimen to develop a predetermined color intensity as compared with said blank.

5. A colorimetric method of testing for the state of pregnancy comprising admixing to both the urine specimen of a human female and a blank N,N-dimethyl phenylenediamine oxalate, copper sulfate, and hydrogen peroxide and comparing the time required for said urine specimen to develop a predetermined color intensity as compared with said blank.

6. The method as claimed in claim 5 wherein to 10 ml. of the urine specimen and the blank as added between 0.0125 gm. and 0.05 gm. of said N,N-dimethyl phenylenediamine oxalate, between 0.0 and 0.25 gm. of said copper sulfate and between 0.0 and 3 ml. of a 3 percent solution of said hydrogen peroxide.

7. A colorimetric method of testing for the state of pregnancy comprising admixing to both a urine specimen of a human female and a blank a compound taken from the group consisting of alkyl and aryl substituted phenylenediamines and their salts and a divalent metallic salt and comparing the time required for said urine specimen to develop a predetermined color intensity as compared with said blank.

8. A colorimetric method of testing for the state of pregnancy comprising admixing per 10 ml. of both a urine specimen of a human female and a blank a compound taken from the group consisting of alkyl and aryl substituted phenylenediamines and their salts in an amount equivalent to between 0.0125 gm. and 0.05 gm. of N,N-dimethyl phenylenediamine oxalate and between 0.0 and 0.25 gm. of a divalent salt and comparing the time required for said urine specimen to develop a predetermined color intensity as compared with said blank.

9. A colorimetric method of testing for the state of pregnancy comprising admixing to both a urine specimen of a human female and a blank a compound taken from the group consisting of alkyl and aryl substituted phenylenediamines and their salts and an oxidizing agent and comparing the time required for said urine specimen to develop a predetermined color intensity as compared with said blank.

10. A colorimetric method for testing for the state of pregnancy comprising admixing per 10 ml. of both a urine specimen of a human female and a blank a compound taken from the group consisting of alkyl and aryl substituted phenylenediamines and their salts in an amount equivalent to between 0.0125 gm. and 0.05 gm. of N,N-dimethyl phenylenediamine oxalate and an oxidizing agent in an amount equivalent to between 0.0 and 3 ml. of a 3 percent hydrogen peroxide solution and comparing the time required for said urine specimen to develop a predetermined color intensity as compared with said blank.

11. A reagent combination for the colorimetric analysis of a factor present only in urine specimens of pregnant human females which comprises in the following relative proportions:

a first container of a compound taken from the group comprising alkyl and aryl substituted phenylenediamines and their salts in an amount equivalent to 0.0125 gm. to 0.05 gm. of N,N-dimethyl phenylenediamine oxalate;

a second container of a divalent metallic salt in an amount up to 0.25 gm.; and a third container of an oxidizing agent equivalent in an amount up to 3 ml. of a 3 percent hydrogen peroxide solution.

12. A reagent combination as claimed in claim 11 wherein said alkyl and aryl substituted phenylenediamines are taken from the group consisting of N,N-dimethyl phenylenediamine, N,N,N',N', tetramethyl phenylenediamine and N phenyl phenylenediamine.

13. A reagent combination as claimed in claim 11 wherein said alkyl and aryl substituted phenylenediamines are taken from the group consisting of ortho, meta, and para substituted diamine toluenes.

14. A reagent combination as claimed in claim 11 wherein the divalent metal of said divalent metallic salt is taken from the group consisting of vanadium, manganese, iron, cobalt, copper and nickel.

15. A reagent combination as claimed in claim 11 wherein said oxidizing agent is taken from the group consisting of hydrogen peroxide, sodium peroxide and ammonium persulfate.

References Cited

Austin, W. E.: Principles and Practice of Fur Dressing and Fur Dyeing, D. Van Nostrand Co., N.Y., 1922, pp. 144–146, 149–153, 155–158, 164–170 relied on.

Roth, L. G. and Leonard, W. G., Jr.: U.S. Armed Forces Medical Journal, vol. V, No. 1, January 1954, pp. 83–85 relied on.

MORRIS O. WOLK, *Primary Examiner.*

R. M. REESE, *Assistant Examiner.*